(12) United States Patent
Nishimura

(10) Patent No.: US 7,499,224 B2
(45) Date of Patent: Mar. 3, 2009

(54) BENT TYPE ZOOM OPTICAL SYSTEM, AND IMAGER, INFORMATION PROCESSOR AND ELECTRONIC CAMERA APPARATUS INCORPORATING THE SAME

(75) Inventor: Kazuya Nishimura, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 24 days.

(21) Appl. No.: 11/724,990

(22) Filed: Mar. 15, 2007

(65) Prior Publication Data
US 2007/0217028 A1 Sep. 20, 2007

(30) Foreign Application Priority Data
Mar. 17, 2006 (JP) ............... 2006-074043

(51) Int. Cl.
*G02B 15/14* (2006.01)
(52) U.S. Cl. ....................... 359/684; 359/676
(58) Field of Classification Search ........... 359/676, 359/683, 684, 686, 687, 688
See application file for complete search history.

(56) References Cited

U.S. PATENT DOCUMENTS 7,180,542 B2 * 2/2007 Iwasawa et al. .......... 348/240.3

FOREIGN PATENT DOCUMENTS

| JP | 2004-170707 | 6/2004 |
|---|---|---|
| JP | 2005-321452 | 11/2005 |

* cited by examiner

*Primary Examiner*—David N Spector
(74) *Attorney, Agent, or Firm*—Kenyon and Kenyon LLP

(57) ABSTRACT

The invention relates to a bent type zoom optical system that is reduced in terms of the whole size and thickness albeit including two reflecting surfaces in an optical path and having a high zoom ratio, and an apparatus incorporating the same. The zoom optical system comprises the positive first lens group G1 adapted to remain fixed upon zooming, the negative second lens group G1 adapted to move upon zooming, and the third lens group G3 adapted to remain fixed upon zooming. The positive first lens group G1 includes the first reflecting member P1, and the third lens group includes the stop S and the second reflecting member P2. The second reflecting member P2 is located in such a way as to bend the optical path in a direction orthogonal to a plane defined by an optical axis of the first lens group G1 on its entrance side and an optical axis bent by the first reflecting member P1, and condition (1) necessary for the proper location of an entrance pupil position is satisfied.

14 Claims, 10 Drawing Sheets

BENT TYPE ZOOM OPTICAL SYSTEM, AND IMAGER, INFORMATION PROCESSOR AND ELECTRONIC CAMERA APPARATUS INCORPORATING THE SAME

This application claims benefit of Japanese Application No. 2006-74043 filed in Japan on Mar. 17, 2006, the contents of which are incorporated by this reference.

BACKGROUND OF THE INVENTION

The present invention relates generally to a bent type zoom optical system, and more particularly to a bent type zoom optical system that is reduced in terms of the whole size and thickness albeit including a reflecting surface in its optical path and having a high zoom ratio.

In recent years, imagers or imaging apparatus using an electronic imaging device as in the case of digital still cameras have been widely available. With the development and widespread use of digital still cameras, there are now growing demands for high image quality and size reductions in general, and for slimmer zoom optical systems having a higher zoom ratio in particular.

As one approach to a slimmer optical system, there is a technique wherein its optical path is bent substantially at right angles using a prism or mirror. As one approach to an optical system having a higher zoom ratio with a longer optical entire length, Patent Publications 1 and 2, referred to below, set forth an optical system wherein there is a second reflecting surface further located on an image plane side with respect to the first reflecting surface to achieve an additional bending of the optical axis.

Patent Publication 1
JP-A-2004-170707
Patent Publication 2
JP-A-2005-321452

With these prior arts with the optical axis bent twice, size reductions are still less than satisfactory because the entrance pupil position remains far on the wide-angle side, causing optical elements on the entrance side to grow large.

SUMMARY OF THE INVENTION

In view of such problems with the prior art as described above, an object of the invention is to provide a bent type zoom optical system that can be reduced in terms of the whole size and thickness albeit including two reflecting surfaces in its optical path and having a high zoom ratio as well as an apparatus incorporating the same.

According to the first aspect of the invention, the aforesaid object is accomplished by the provision of a bent type zoom optical system, characterized by comprising, in order from its object side, a positive first lens group adapted to remain fixed upon zooming, a negative second lens group adapted to move upon zooming, and a third lens group adapted to remain fixed upon zooming, wherein said positive first lens group includes a first reflecting member, and said third lens group includes a stop and a second reflecting member, wherein said second reflecting member is located in such a way as to bend an optical path in a direction orthogonal to a plane defined by an optical axis of said first lens group on the entrance side thereof and an optical axis bent by said first reflecting member, with satisfaction of the following condition:

$$1.4 < |f_2|/f_w < 2.5 \qquad (1)$$

where $f_2$: the focal length of the second lens group, and $f_w$: the focal length of the zoom optical system at a wide-angle end.

The advantage of, and the requirement for, the bent type zoom optical system constructed according to the second aspect of the invention is now explained.

Condition (1) is necessary for the proper determination of an entrance pupil position. As the lower limit of 1.4 to condition (1) is not reached, it causes the entrance pupil position to go far because the refracting power of the second lens group grows too strong, rendering the first lens group too bulky to slim down the optical system and apparatus. As the upper limit of 2.5 to condition (2) is exceeded, it renders it difficult to obtain any desired high zoom ratio because the refracting power of the second lens group grows weak.

According to the second aspect of the invention, there is a bent type zoom optical system provided, which is characterized by comprising, in order from its object side, a positive first lens group adapted to remain fixed upon zooming, a negative second lens group adapted to move upon zooming, and a third lens group adapted to remain fixed upon zooming, wherein said positive first lens group includes a first reflecting member and a negative single lens on the object side of said first reflecting member, and said third lens group includes a stop and a second reflecting member, wherein said second reflecting member is located in such a way as to bend an optical path in a direction orthogonal to a plane defined by an optical axis of said first lens group on the entrance side thereof and an optical axis bent by said first reflecting member, with satisfaction of the following condition:

$$0.5 < |L_1|/f_1 < 1.0 \qquad (2)$$

where $L_1$: the focal length of the negative lens in the first lens group, and $f_1$: the focal length of the first lens group.

The advantage of, and the requirement for, the bent type zoom optical system constructed according to the second aspect of the invention is now explained.

Condition (2) is provided to properly determine an entrance pupil position. As the lower limit of 0.5 to condition (2) is not reached, it causes the entrance pupil position to draw near, rendering it difficult to make proper correction of off-axis aberrations on a wide-angle side and axial aberrations on a telephoto side. As the upper limit of 1.0 to condition (2) is exceeded, it causes the entrance pupil to remain deep, rendering the first lens group too bulky to slim down the whole optical system.

According to the third aspect of the invention, there is a bent type zoom optical system provided, which is characterized by comprising, in order from its object side, a positive first lens group adapted to remain fixed upon zooming, a negative second lens group adapted to move toward an image plane side upon zooming from a wide-angle side to a telephoto side, a third lens group adapted to remain fixed upon zooming, and a unit designed such that a combined focal length distance between said third lens group and an image plane is positive, wherein said positive first lens group includes a first reflecting member and a negative single lens on the object side of said first reflecting member, and said third lens group comprises, in order from its object side, a stop, a second reflecting member and a positive lens unit, wherein said second reflecting member is located in such a way as to bend an optical path in a direction orthogonal to a plane defined by an optical axis of said first lens group on the entrance side thereof and an optical axis bent by said first reflecting member.

The advantage of, and the requirement for, the bent type zoom optical system constructed according to the third aspect of the invention is now explained.

If the space between the second lens group and the stop remains narrow upon zooming to the telephoto end, the entrance pupil position can then be kept shallow from the wide-angle side to the telephoto send. By keeping the entrance pupil position shallow, the space necessary to bend the optical path at the first reflecting member can be kept narrow, with the result that the distance between the negative lens in the first lens group and the second lens group can be kept short on the wide-angle side. Referring here to a zoom lens started with a negative and a positive lens group, if the distance between the negative lens in the first lens group and the second lens group can be short on a wide-angle side, it is then possible to enhance the zooming effect of the second lens group, reducing the amount of movement of the second lens group and easing loads of the second lens group on aberration correction, with the result that a camera can be slimmed down and easily manufactured.

Note here that it is preferable to satisfy the following condition:

$$0 < d_s/f_t < 0.1 \tag{3}$$

where $d_s$: the distance between the second lens group and the stop on the telephoto end, and $f_t$: the focal length of the zoom optical system at the telephoto end.

The lower limit of 0 to condition (3) is provided to make it easy to drive the second lens group. Control of the second lens group can be easily gained with an improved assembling accuracy. It is also possible to set that lower limit below 0 at which further size reductions may be achievable. As the upper limit of 0.1 is exceeded, it renders it difficult to achieve size reductions. At greater than that upper limit, a lot more lenses may be required with a lens element placed between the second lens group and the stop; however, this is not preferable in view of cost and the ability to assemble.

According to the fourth aspect of the invention, there is a bent type zoom optical system provided, which is characterized by comprising, in order from its object side, a positive first lens group adapted to remain fixed upon zooming, a negative second lens group adapted to move toward an image plane side upon zooming from a wide-angle side to a telephoto side, a third lens group adapted to remain fixed upon zooming, and a unit designed such that a combined focal length distance between said third lens group and an image plane is positive, wherein said positive first lens group includes a first reflecting member and a negative single lens on the object side of said first reflecting member, said second lens group consists of, in order from its object side, a negative lens and a positive lens: two lenses in all, and said third lens group comprises a stop and a second reflecting member, wherein said second reflecting member is located in such a way as to bend an optical path in a direction orthogonal to a plane defined by an optical axis of said first lens group on the entrance side thereof and an optical axis bent by said first reflecting member.

The advantage of, and the requirement for, the bent type zoom optical system constructed according to the fourth aspect of the invention is now explained.

With fluctuations of aberrations inclusive of chromatic aberration due to zooming in mind, the minimum number of the second lens group must be two: a negative lens and a positive lens. By locating the negative and the positive lens in this order from the object side, a principal point position can be located on the object side, so that the principal point space between the first lens group and the second lens group can be narrowed down (in the minus direction) at the wide-angle end. It is thus possible to enhance the zooming effect of the second lens group, reducing the amount of movement of the second lens group and easing loads of the second lens group on aberration correction. If the second lens group is composed of three or more lenses, the effect on aberration correction may then be enhanced. However, this arrangement is not efficient because the principal point space between the first lens group and the second lens group grows wide, with increased loads on the second lens group, too.

Note here that it is preferable to satisfy the following condition:

$$0 \leq |d_{g2}/f_2| < 0.3 \tag{4}$$

where $d_{g2}$: the space between the lenses in the second lens group, and $f_2$: the focal length of the second lens group.

Exceeding the upper limit of 0.3 to condition (4) is not preferable because the length of the second lens group becomes long contrary to size reductions. As a result of a lot more loads on the negative lens, the occurrence of aberrations such as chromatic aberration cannot be controlled with the minimum number of lenses.

Preferably in the bent type zoom optical system according to the third or fourth aspect of the invention, the aforesaid unit is constructed of a positive fourth lens group and a positive fifth lens group that move in such a way as to lie on the object side and the image side, respectively, on the telephoto side relative to the wide-angle end upon zooming.

By adding to that unit a condensing function and an image plane alignment function plus a zooming function, it is possible to ease loads on the second lens group. By setting up this unit as described above, it is also possible to reduce the number of moving lens groups and narrow down the space between the third lens group and the image plane.

Further, by constructing the fourth lens group of a positive lens and a negative lens on the image-plane side of said positive lens and constructing the fifth lens group of a positive lens, it is possible for the whole unit to have a preferable triplet arrangement comprising a positive, a negative and a positive component that are controllable with fewer lenses.

Note here that it is preferable to satisfy the following condition:

$$0.2 \leq |M_5/M_4| \leq 1 \tag{5}$$

where $M_4$: the amount of change in the position of the fourth lens group at the wide-angle and telephoto ends, and $M_5$: the amount of change in the position of the fifth lens group at the wide-angle and telephoto ends.

As the lower limit of 0.2 to condition (5) is not reached, it is hard for the aforesaid unit to have zooming effects, and as the upper limit of 1 is exceeded, there are a lot more loads on the fifth lens group, resulting in the need of rendering the construction of the fifth lens group more complicated (the fourth lens group should in itself be composed of plural lenses because of the need of having a function of correcting axial aberrations).

Each of the bent type zoom optical systems of the invention as described above may be configured as an imaging apparatus comprising an imaging device located at a position for the reception of an object image formed by that bent type zoom optical system.

The bent type zoom optical system of the invention may also be set up in the form of an information processor that comprises an imaging device located at a position for the reception of an object image formed by said bent type zoom optical system, a CPU adapted to process electronic signals photoelectrically converted by that imaging device, an input portion adapted to receive information signals that an operator wants to enter in the CPU, a display processing means adapted to display an output from the CPU on a display apparatus (e.g., LCD), and a recording medium adapted to record an output from the CPU, wherein the CPU is designed such that an object image received through the bent type zoom optical system at the imaging device is displayed on the display apparatus.

The information processor here includes a portable terminal (e.g., a cellular phone, and PDA).

Further, the bent type zoom optical system of the invention may be set up in the form of an electronic camera apparatus that comprises an imaging device located at a position for reception of an object image formed by said bent type zoom optical system, a CPU adapted to process electronic signals photoelectrically converted by said imaging device, and a display device for displaying an object image received at said imaging device in a visible way, wherein a recording medium for recording image information on the object image received at said imaging device is incorporated, or inserted or de-inserted, and said CPU includes a display apparatus adapted to display on the display device an object image received at the imaging device and recording/processing means adapted to record the object image received at said imaging device in said recording medium.

As described above, the present invention provides a bent type zoom optical system that can be reduced in terms of the whole size and thickness albeit including two optical paths in an optical path and having a high zoom ration as well as an electronic camera or an information processor such as a portable terminal incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
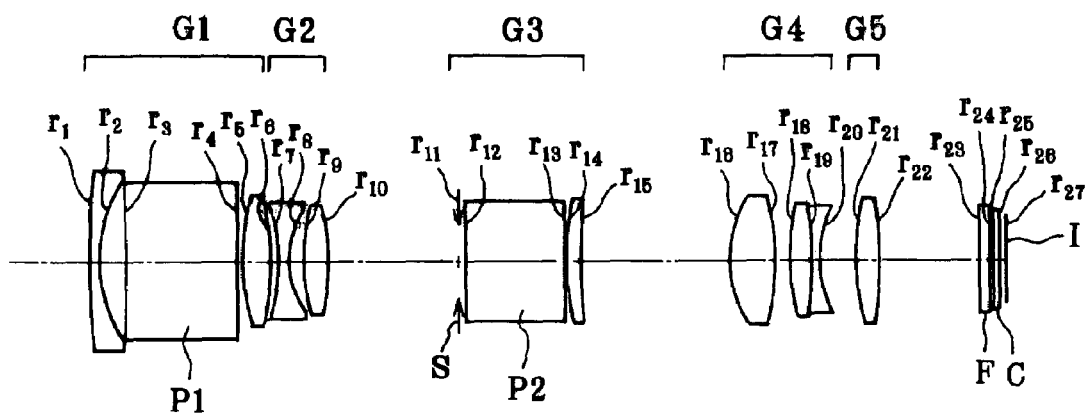
FIG. 1 is illustrative in optical exploded form of Example 1 of the bent type zoom optical system of the invention upon focusing on an infinite object point at the wide-angle end (a), in an intermediate setting (b), and the telephoto end (c).
Figure 1B:
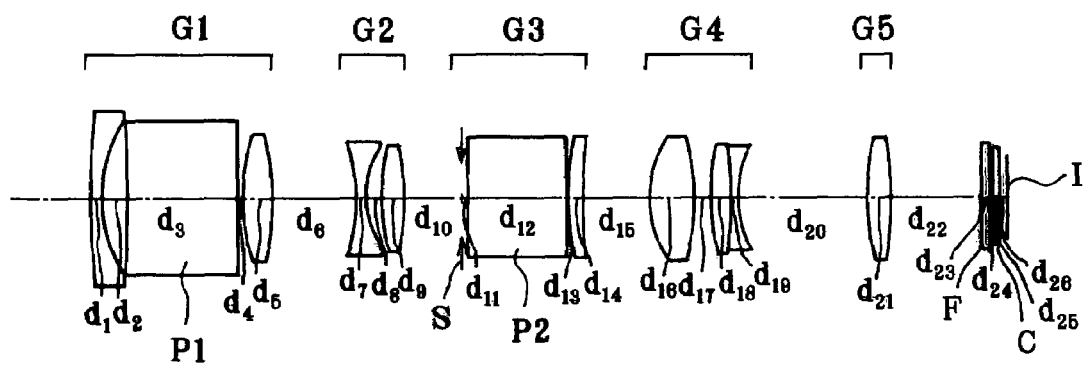
Figure 1C:
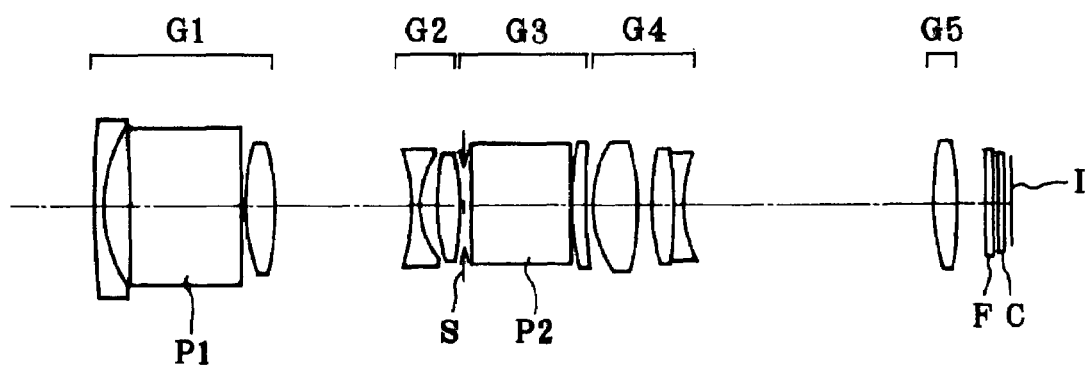
Figure 2A:
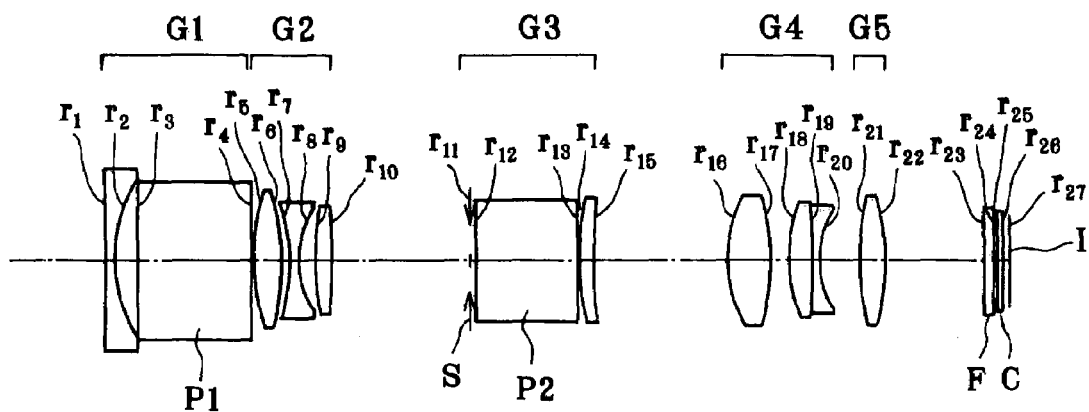
FIG. 2 is illustrative in optical exploded form of Example 2 of the bent type zoom optical system of the invention upon focusing on an infinite object point at the wide-angle end (a), in an intermediate setting (b), and the telephoto end (c).
Figure 2B:
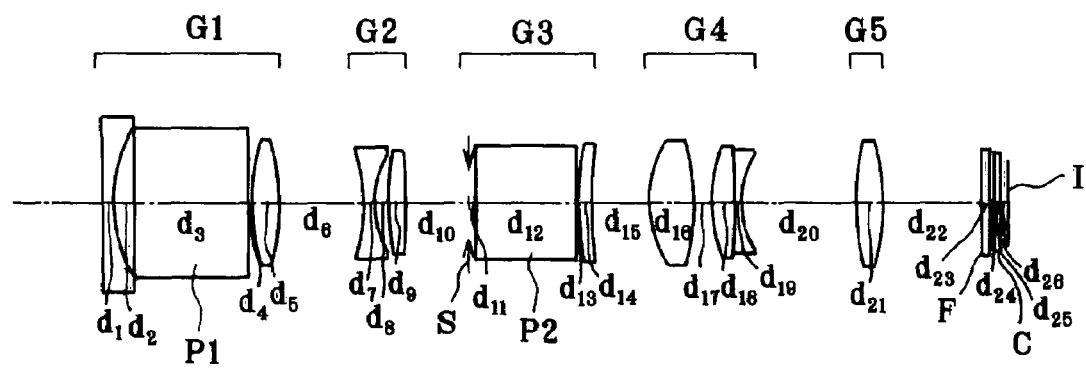
Figure 2C:
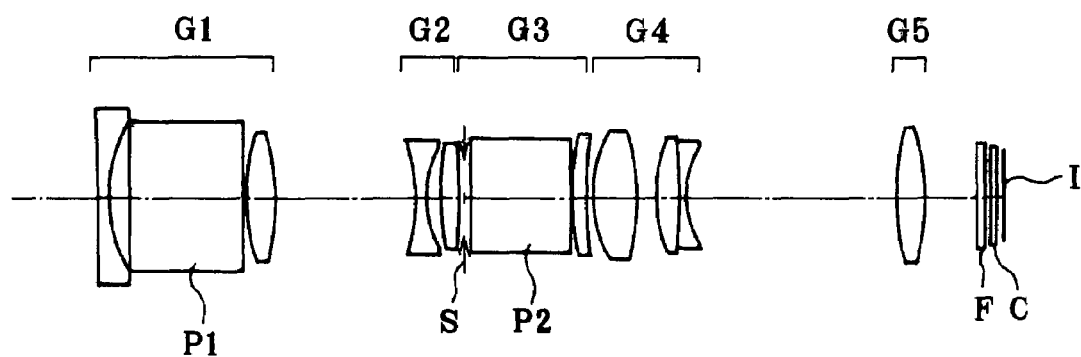

Set out below are Examples 1 and 2 of the bent type zoom optical system according to the invention. FIGS. 1(a), 1(b) and 2(c) are taken-apart optical path views of Example 1 upon focusing on an infinite object point at the wide-angle end (a), in an intermediate setting (b), and at the telephoto end (c), and FIGS. 2(a), 2(b) and 2(c) are taken-apart optical path views of Example 2 upon focusing on an infinite object point at the wide-angle end (a), in an intermediate setting (b), and at the telephoto end (c). In FIGS. 1 and 2, the first lens group G1 is indicated by G1, the second lens group by G2, an aperture stop by S, the third lens group by G3, the fourth lens group by G4, the fifth lens group by G5, an optical low-pass filter F, the cover glass of an electronic imaging device or CCD by G, and the image plane of CCD by I. In FIGS. 1 and 2, it is noted that the optical path-bending (flexing) prism located as the first reflecting member in the first lens group G1 is shown as a plane-parallel plate P1 with its optical path taken apart, and the optical path-bending (flexing) prism located as the second reflecting member in the third lens group G3 is shown as a plane-parallel plate P2 with its optical path taken apart; in either case, however, there is no reflecting surface shown. Note here that a near-infrared sharp cut coating, for instance, may be applied directly to the optical low-pass filter F, or there may be another infrared cut absorption filter provided. Alternatively, it is also possible to use a near-infrared sharp cut coating applied onto the entrance surface of a transparent flat sheet.

EXAMPLE 1

As shown in FIG. 1, this example is directed to a bent type zoom optical system built up of, in order from its object side, the first lens group G1 having positive power and adapted to remain fixing upon zooming, the second lens group G2 having negative power and adapted to move toward an image side from a wide-angle end to a telephoto end upon zooming such that it is positioned on the image side at the telephoto end rather than at the wide-angle end, the third lens group G3 having positive power and adapted to remain fixed upon zooming, the fourth lens group G4 having positive power and adapted to move toward the object side from the wide-angle end to the telephoto end upon zooming such that it is positioned on the object side at the telephoto end rather than at the wide-angle end, and the fifth lens group G5 having positive power and adapted to move toward the image side from the wide-angle end to the telephoto end. The first optical path bending (flexing) is implemented by the first prism P1 located in the first lens group G1, and the second optical path bending (flexing) is implemented by the second prism P2 located between the aperture stop S and a positive single lens in the third lens group G3 in a direction orthogonal to a plane defined by an optical path entering the first lens group G1 and an optical axis bent by the first prism P1. An optical path is bent by the first optical path bending in a camera's longitudinal direction, and by the second optical bending in a camera's transverse direction. Focusing is done at the third G3, the fourth G4 or the fifth lens group G5. Note here that the fourth G4 and the fifth lens group G5 form together a positive power unit.

Referring to how each lens group is constructed in order from the object side, the first lens group G1 is made up of a negative meniscus lens convex on its object side, the first prism P1 and a double-convex positive lens; the second lens group G2 is made up of a double-concave negative lens and a double-convex positive lens; the third lens group G3 is made up of the aperture stop S, the second prism P2 and a positive meniscus lens convex on its object side; the fourth lens group G4 is made up of a double-convex positive lens and a doublet consisting of a double-convex positive lens and a double-concave negative lens; and the fifth lens group G5 is made up of one double-convex positive lens.

Five aspheric surfaces are used: one for the object-side surface of the double-convex positive lens in the first lens group G1, one for the image-side surface of the double-concave negative lens in the second lens group G2, two for both surfaces of the single lens or double-convex positive lens in the fourth lens group G4, and one for the image-side surface of the double-convex positive lens in the fifth lens group G5.

EXAMPLE 2

As shown in FIG. 2, this example is directed to a bent type zoom optical system built up of, in order from its object side, the first lens group G1 having positive power and adapted to remain fixing upon zooming, the second lens group G2 having negative power and adapted to move toward an image side from a wide-angle end to a telephoto end upon zooming such that it is positioned on the image side at the telephoto end rather than at the wide-angle end, the third lens group G3 having positive power and adapted to remain fixed upon zooming, the fourth lens group G4 having positive power and adapted to move toward the object side from the wide-angle end to the telephoto end upon zooming such that it is positioned on the object side at the telephoto end rather than at the wide-angle end, and the fifth lens group G5 having positive power and adapted to move toward the image side from the wide-angle end to the telephoto end. The first optical path bending (flexing) is implemented by the first prism P1 located in the first lens group G1, and the second optical path bending (flexing) is implemented by the second prism P2 located between the aperture stop S and a positive single lens in the third lens group G3 in a direction orthogonal to a plane defined by an optical path entering the first lens group G1 and an optical axis bent by the first prism P1. An optical path is bent by the first optical path bending in a camera's longitudinal direction, and by the second optical bending in a camera's transverse direction. Focusing is done at the third G3, the fourth G4 or the fifth lens group G5. Note here that the fourth G4 and the fifth lens group G5 form together a positive power unit.

Referring to how each lens group is constructed in order from the object side, the first lens group G1 is made up of a negative meniscus lens convex on its object side, the first prism P1 and a double-convex positive lens; the second lens group G2 is made up of a double-concave negative lens and a double-convex positive lens; the third lens group G3 is made up of the aperture stop S, the second prism P2 and a positive meniscus lens convex on its object side; the fourth lens group G4 is made up of a double-convex positive lens and a doublet consisting of a double-convex positive lens and a double-concave negative lens; and the fifth lens group G5 is made up of one double-convex positive lens.

Five aspheric surfaces are used: one for the object-side surface of the double-convex positive lens in the first lens group G1, one for the image-side surface of the double-concave negative lens in the second lens group G2, two for both surfaces of the single lens or double-convex positive lens in the fourth lens group G4, and one for the image-side surface of the double-convex positive lens in the fifth lens group G5.

Set out below are numerical data on each example. The symbols used hereinafter but not hereinbefore have the following meanings.

f: the focal length of the zoom optical system,
$F_{NO}$: F-number,
$2\omega$: a full angle of view,
WE: the wide-angle end,
ST: the intermediate setting,
TE: the telephoto end,
$r_1, r_2, \ldots$: the radius of curvature of each lens surface,
$d_1, d_2, \ldots$: the space between adjoining lens surfaces,
$n_{d1}, n_{d2}, \ldots$: the d-line refractive index of each lens, and
$V_{d1}, V_{d2}, \ldots$: the Abbe number of each lens.

Here let x be indicative of an optical axis provided that the direction of travel of light is taken as positive, and y be indicative of a direction orthogonal to the optical axis. Then, aspheric shape is given by $$x = (y^2/r)/\left[1 + \{1 - (K+1)(y/r)^2\}^{1/2}\right] + A_4 y^4 + A_6 y^6 + A_8 y^8 + A_{10} y^{10}$$

where r is a paraxial radius of curvature, K is a conical coefficient, and $A_4, A_6, A_8$ and $A_{10}$ are the $4^{th}$, $6^{th}$, $8^{th}$ and $10^{th}$ aspheric coefficients, respectively.

Example 1

| | | | |
|---|---|---|---|
| $r_1 = 104.358$ | $d_1 = 1.04$ | $n_{d1} = 1.84666$ | $v_{d1} = 23.78$ |
| $r_2 = 13.235$ | $d_2 = 2.36$ | | |
| $r_3 = \infty$ | $d_3 = 11.00$ | $n_{d2} = 1.83400$ | $v_{d2} = 37.16$ |
| $r_4 = \infty$ | $d_4 = 0.20$ | | |
| $r_5 = 17.573$ (Aspheric) | $d_5 = 2.80$ | $n_{d3} = 1.74330$ | $v_{d3} = 49.33$ |
| $r_6 = -26.663$ | $d_6 = $ (Variable) | | |
| $r_7 = -16.879$ | $d_7 = 1.00$ | $n_{d4} = 1.80610$ | $v_{d4} = 40.92$ |
| $r_8 = 6.518$ (Aspheric) | $d_8 = 1.47$ | | |
| $r_9 = 20.438$ | $d_9 = 2.18$ | $n_{d5} = 1.80518$ | $v_{d5} = 25.42$ |
| $r_{10} = -31.480$ | $d_{10} = $ (Variable) | | |
| $r_{11} = \infty$ (Stop) | $d_{11} = 0.50$ | | |
| $r_{12} = \infty$ | $d_{12} = 9.50$ | $n_{d6} = 1.83400$ | $v_{d6} = 37.16$ |
| $r_{13} = \infty$ | $d_{13} = 0.17$ | | |
| $r_{14} = 29.002$ | $d_{14} = 1.42$ | $n_{d7} = 1.80518$ | $v_{d7} = 25.42$ |
| $r_{15} = 95.793$ | $d_{15} = $ (Variable) | | |
| $r_{16} = 10.038$ (Aspheric) | $d_{16} = 4.36$ | $n_{d8} = 1.49700$ | $v_{d8} = 81.54$ |
| $r_{17} = -22.334$ (Aspheric) | $d_{17} = 1.42$ | | |
| $r_{18} = 21.572$ | $d_{18} = 2.16$ | $n_{d9} = 1.48749$ | $v_{d9} = 70.23$ |
| $r_{19} = -40.165$ | $d_{19} = 0.67$ | $n_{d10} = 1.80518$ | $v_{d10} = 25.42$ |
| $r_{20} = 9.201$ | $d_{20} = $ (Variable) | | |
| $r_{21} = 22.252$ | $d_{21} = 2.26$ | $n_{d11} = 1.52542$ | $v_{d11} = 55.78$ |
| $r_{22} = -32.485$ (Aspheric) | $d_{22} = $ (Variable) | | |

-continued

| | | | |
|---|---|---|---|
| $r_{23} = \infty$ | $d_{23} = 0.75$ | $n_{d12} = 1.51633$ | $\nu_{d12} = 64.14$ |
| $d_{24} = \infty$ | $d_{24} = 0.50$ | | |
| $r_{25} = \infty$ | $d_{25} = 0.50$ | $n_{d13} = 1.51633$ | $\nu_{d13} = 64.14$ |
| $r_{26} = \infty$ | $d_{26} = 0.70$ | | |
| $r_{27} = \infty$ | | | |
| (Imaging plane) | | | |

Aspherical Coefficients

5th surface

K = 0.000
$A_4 = -4.73735 \times 10^{-5}$
$A_6 = 8.31918 \times 10^{-8}$
$A_8 = -3.17249 \times 10^{-9}$
$A_{10} = 2.77516 \times 10^{-11}$ 8th surface K = 0.000
$A_4 = -9.10433 \times 10^{-4}$
$A_6 = 1.60066 \times 10^{-6}$
$A_8 = -2.22236 \times 10^{-7}$
$A_{10} = -3.21255 \times 10^{-9}$ 16th surface K = 0.000
$A_4 = -9.55616 \times 10^{-5}$
$A_6 = -1.32662 \times 10^{-8}$
$A_8 = 4.23585 \times 10^{-9}$
$A_{10} = -6.61303 \times 10^{-10}$ 17th surface K = 0.000
$A_4 = 9.58068 \times 10^{-5}$
$A_6 = 1.34406 \times 10^{-6}$
$A_8 = -5.20338 \times 10^{-8}$
$A_{10} = 1.36430 \times 10^{-10}$ 22th surface K = 0.000
$A_4 = 1.12322 \times 10^{-4}$
$A_6 = -2.35000 \times 10^{-6}$
$A_8 = 5.35619 \times 10^{-8}$
$A_{10} = 2.47846 \times 10^{-10}$ Zooming Data (∞)

| | WE | ST | TE |
|---|---|---|---|
| f (mm) | 6.44 | 14.05 | 31.03 |
| $F_{NO}$ | 3.15 | 3.64 | 4.76 |
| 2ω (°) | 63.24 | 29.73 | 13.77 |
| $d_6$ | 0.70 | 7.90 | 12.85 |
| $d_{10}$ | 12.65 | 5.45 | 0.50 |
| $d_{15}$ | 14.29 | 6.34 | 0.50 |
| $d_{20}$ | 3.64 | 12.46 | 24.34 |
| $d_{22}$ | 9.66 | 8.73 | 2.70 |

Example 2

| | | | |
|---|---|---|---|
| $r_1 = 210.412$ | $d_1 = 1.04$ | $n_{d1} = 1.84666$ | $\nu_{d1} = 23.78$ |
| $r_2 = 13.741$ | $d_2 = 2.15$ | | |
| $r_3 = \infty$ | $d_3 = 11.00$ | $n_{d2} = 1.80100$ | $\nu_{d2} = 34.97$ |
| $r_4 = \infty$ | $d_4 = 0.20$ | | |
| $r_5 = 18.216$ (Aspheric) | $d_5 = 2.73$ | $n_{d3} = 1.74330$ | $\nu_{d3} = 49.33$ |
| $r_6 = -24.364$ | $d_6 =$ (Variable) | | |
| $r_7 = -20.008$ | $d_7 = 1.00$ | $n_{d4} = 1.80610$ | $\nu_{d4} = 40.92$ |
| $r_8 = 7.299$ (Aspheric) | $d_8 = 1.37$ | | |
| $r_9 = 21.981$ | $d_9 = 1.78$ | $n_{d5} = 1.92286$ | $\nu_{d5} = 20.88$ |
| $r_{10} = -108.452$ | $d_{10} =$ (Variable) | | |
| $r_{11} = \infty$ (Stop) | $d_{11} = 0.50$ | | |
| $r_{12} = \infty$ | $d_{12} = 9.50$ | $n_{d6} = 1.83400$ | $\nu_{d6} = 37.16$ |
| $r_{13} = \infty$ | $d_{13} = 0.17$ | | |
| $r_{14} = 24.558$ | $d_{14} = 1.40$ | $n_{d7} = 1.80518$ | $\nu_{d7} = 25.42$ |
| $r_{15} = 52.623$ | $d_{15} =$ (Variable) | | |
| $r_{16} = 10.137$ (Aspheric) | $d_{16} = 4.19$ | $n_{d8} = 1.49700$ | $\nu_{d8} = 81.54$ |
| $r_{17} = -27.484$ (Aspheric) | $d_{17} = 1.79$ | | |
| $r_{18} = 13.991$ | $d_{18} = 2.32$ | $n_{d9} = 1.48749$ | $\nu_{d9} = 70.23$ |
| $r_{19} = -91.860$ | $d_{19} = 0.66$ | $n_{d10} = 1.80518$ | $\nu_{d10} = 25.42$ |
| $r_{20} = 7.838$ | $d_{20} =$ (Variable) | | |
| $r_{21} = 27.168$ | $d_{21} = 2.51$ | $n_{d11} = 1.52542$ | $\nu_{d11} = 55.78$ |
| $r_{22} = -21.646$ (Aspheric) | $d_{22} =$ (Variable) | | |
| $r_{23} = \infty$ | $d_{23} = 0.75$ | $n_{d12} = 1.51633$ | $\nu_{d12} = 64.14$ |
| $r_{24} = \infty$ | $d_{24} = 0.50$ | | |
| $r_{25} = \infty$ | $d_{25} = 0.50$ | $n_{d13} = 1.51633$ | $\nu_{d13} = 64.14$ |
| $r_{26} = \infty$ | $d_{26} = 0.70$ | | |
| $r_{27} = \infty$ | | | |
| (Imaging plane) | | | |

Aspherical Coefficients

5th surface

K = 0.000
$A_4 = -4.97943 \times 10^{-5}$
$A_6 = 8.78312 \times 10^{-9}$
$A_8 = -1.52761 \times 10^{-9}$
$A_{10} = 1.68295 \times 10^{-11}$ 8th surface K = 0.000
$A_4 = -5.95118 \times 10^{-4}$
$A_6 = -1.34035 \times 10^{-6}$
$A_8 = 8.79934 \times 10^{-8}$
$A_{10} = -6.98166 \times 10^{-9}$ 16th surface K = 0.000
$A_4 = -8.93128 \times 10^{-5}$
$A_6 = -1.02000 \times 10^{-6}$
$A_8 = 1.30104 \times 10^{-8}$
$A_{10} = -1.31039 \times 10^{-9}$ 17th surface K = 0.000
$A_4 = 7.57998 \times 10^{-5}$
$A_6 = 3.06543 \times 10^{-7}$
$A_8 = -6.69238 \times 10^{-8}$
$A_{10} = 4.94863 \times 10^{-12}$ 22th surface K = 0.000
$A_4 = 8.18790 \times 10^{-5}$
$A_6 = -2.10127 \times 10^{-6}$
$A_8 = 5.26978 \times 10^{-8}$
$A_{10} = 1.12678 \times 10^{-10}$ Zooming Data (∞)

| | WE | ST | TE |
|---|---|---|---|
| f (mm) | 6.45 | 14.08 | 31.04 |
| $F_{NO}$ | 3.33 | 3.70 | 4.44 |
| 2ω (°) | 63.27 | 29.66 | 13.77 |
| $d_6$ | 0.70 | 7.92 | 13.43 |
| $d_{10}$ | 13.23 | 6.01 | 0.50 |
| $d_{15}$ | 12.75 | 5.38 | 0.50 |
| $d_{20}$ | 3.92 | 11.12 | 20.46 |
| $d_{22}$ | 9.51 | 9.64 | 5.25 |

Figure 3A:
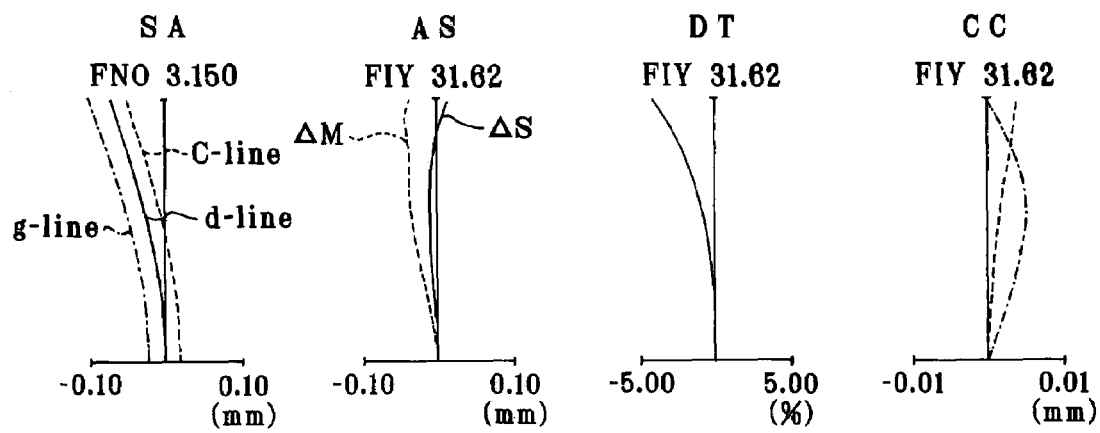
FIG. 3 is indicative of aberrations for Example 1 upon focusing on an infinite object point at the wide-angle end (a), in the intermediate setting (b), and at the telephoto end (c).
Figure 3B:
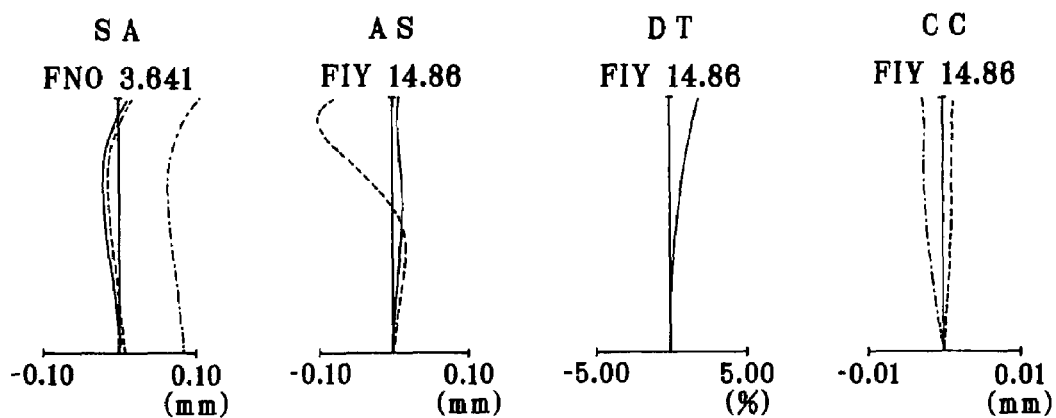
Figure 3C:
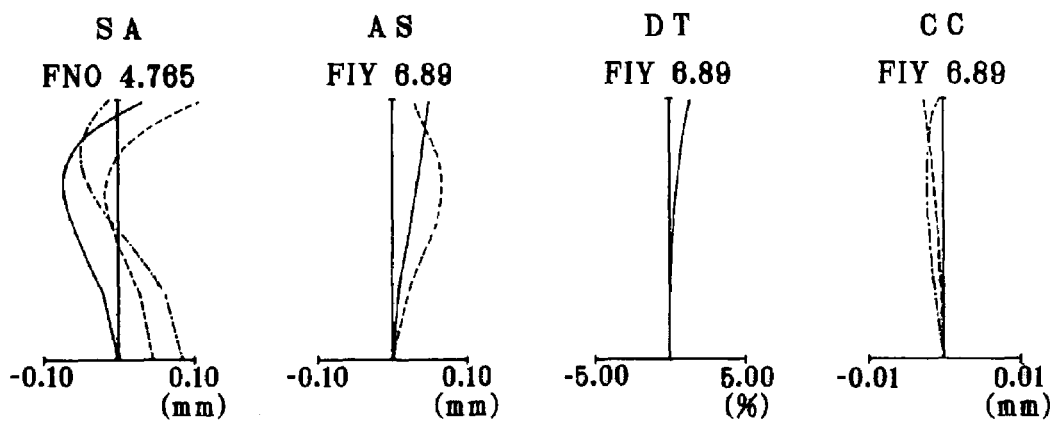
Figure 4A:
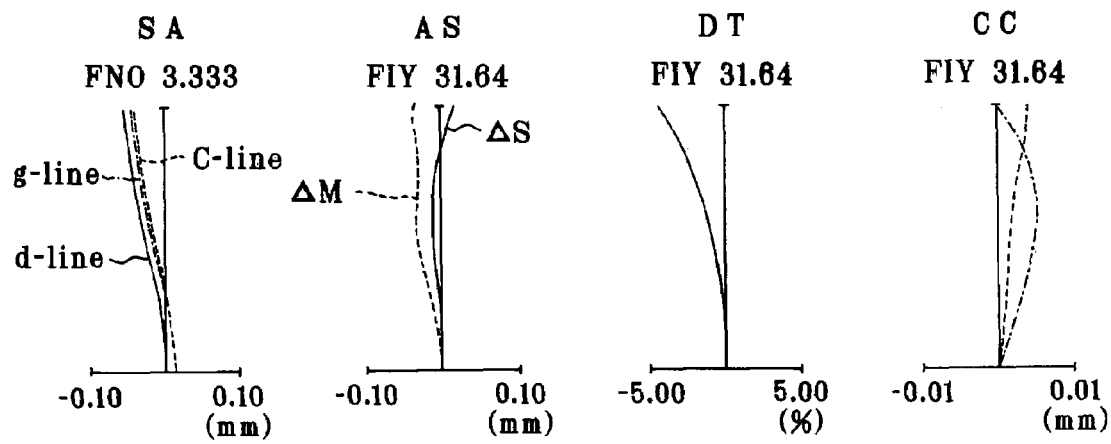
FIG. 4 is indicative of aberrations for Example 2 upon focusing on an infinite object point at the wide-angle end (a), in the intermediate setting (b), and at the telephoto end (c).
Figure 4B:
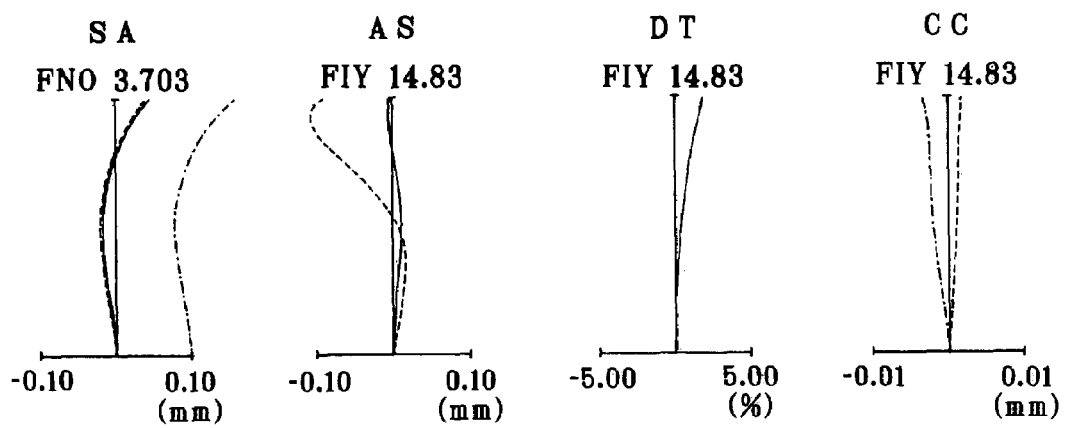
Figure 4C:
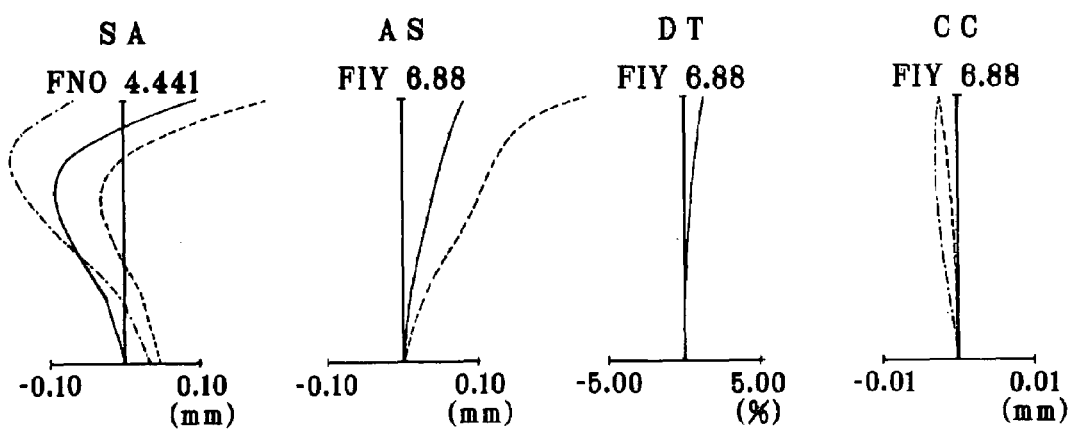

FIGS. 3 and 4 are aberration diagrams for Examples 1 and 2 upon focusing on an object point at infinity, respectively. In these aberration diagrams, (a), (b) and (c) are spherical aberrations (SA), astigmatisms (AS), distortions (DT) and chromatic aberrations of magnification (CC) at the wide-angle end, in the intermediate setting, and the telephoto end, respectively, with "FIY" standing for a maximum image height.

Tabulated below are the values of conditions (1), (2), (3), (4) and (5) in Examples 1 and 2.

|  | Example 1 | Example 2 |
|---|---|---|
| (1) $|f_2|/f_w$ | 1.775 | 1.721 |
| (2) $|L_1|/f_1$ | 0.853 | 0.839 |
| (3) $d_s/f_t$ | 0.016 | 0.016 |
| (4) $|d_{g2}/f_2|$ | 0.129 | 0.124 |
| (5) $|M_5/M_4|$ | 0.506 | 0.347 |

In use, the bent type zoom optical system according to each example of the invention is combined with an electronic imaging device or CCD placed on the image plane I, which is adapted to take an oblong screen with a long side lying in the horizontal direction. In this case, an optical path may be bent by the first prism P1 located in the first lens group G1 in the short side (longitudinal) direction of CCD, and then by the second prism P2 located in the third lens group G3 in the long side (transverse) direction. Alternatively, the optical path may just as well be bent by the first prism P1 in the long side (transverse) direction, and then by the second prism P2 in the short side (longitudinal) direction.

The bent type zoom optical system of the invention here may be used with a taking apparatus wherein an object image is formed through an image-formation optical system such as a zoom optical system, and that image is received at an imaging device such as CCD or silver-salt film for taking purposes. For instance, the aforesaid taking apparatus may be widely used as digital cameras, and digital terminals such as camera-built personal computers, cellular phones and PDAs (personal digital assistants), as embodied below.

Figure 5:
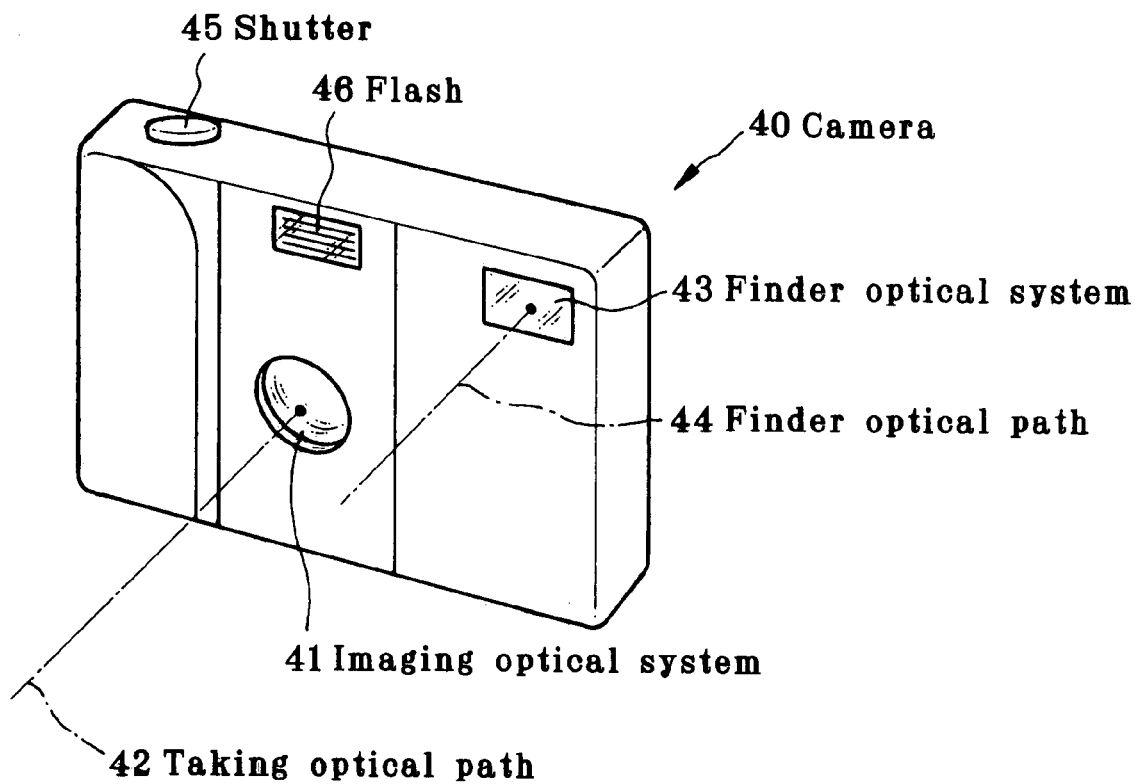
FIG. 5 is a front perspective view of the appearance of a digital camera having the bent zoom optical system of the invention built in it.
Figure 6:
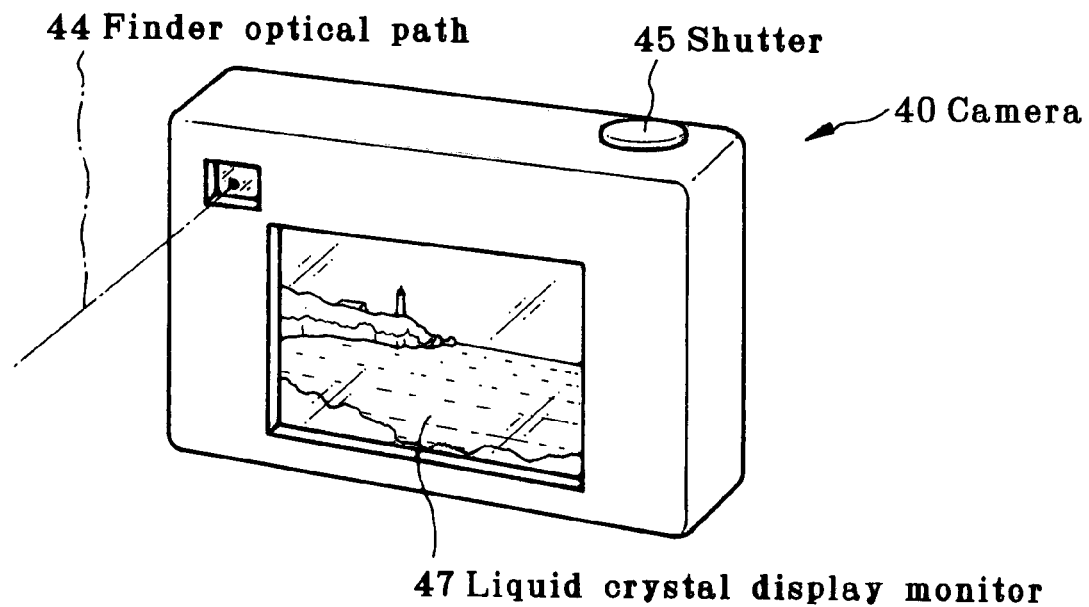
FIG. 6 is a rear perspective view of the digital camera of FIG. 5.
Figure 7:
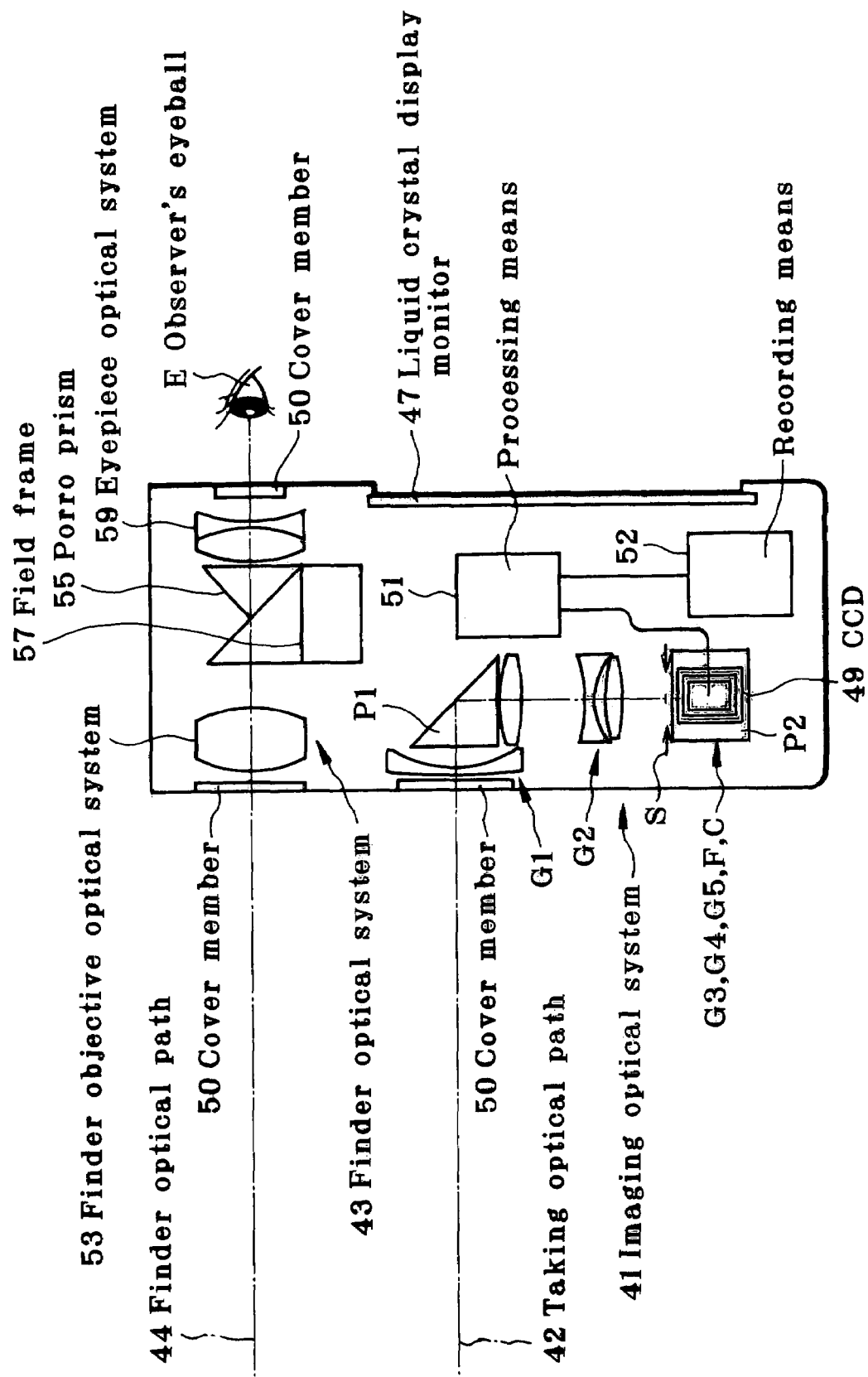
FIG. 7 is illustrative in section of the arrangement of the digital camera of FIG. 5.
Figure 8:
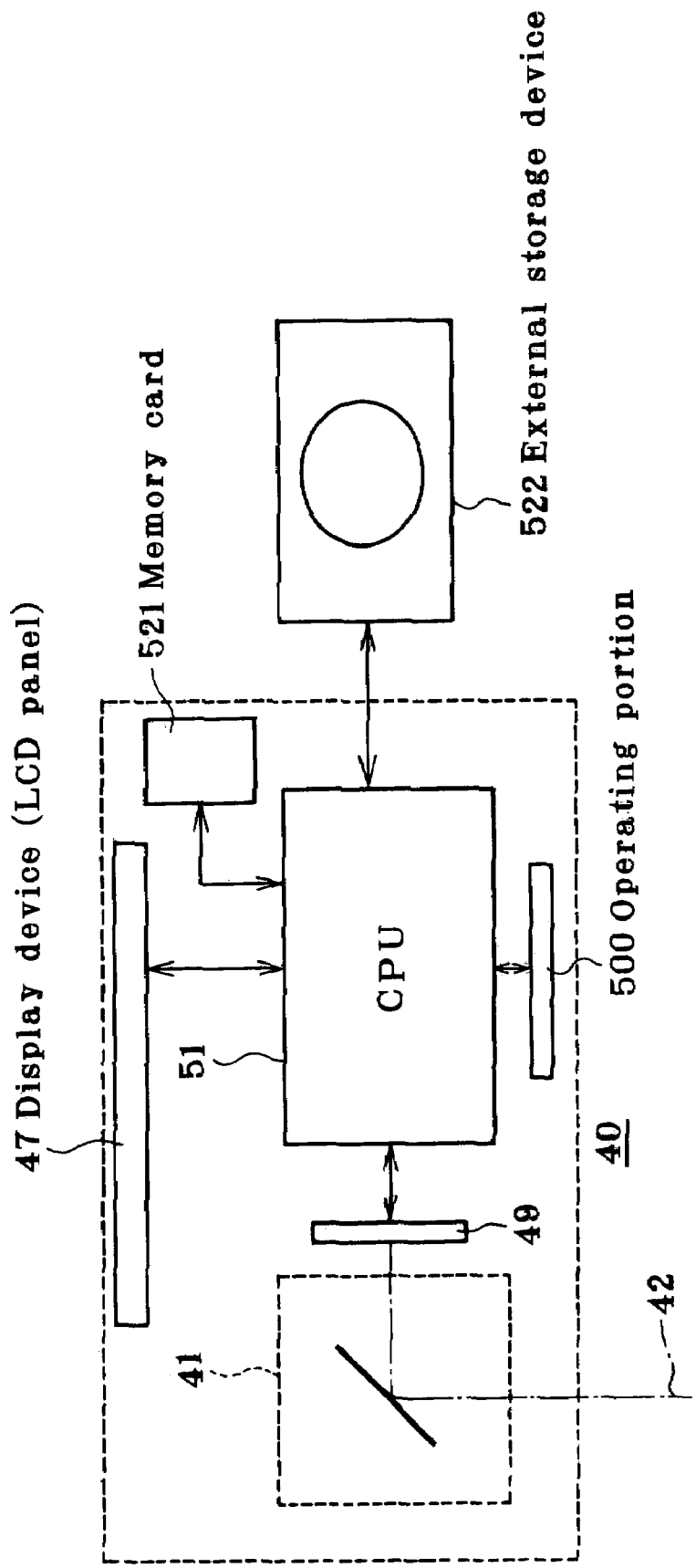
FIG. 8 is a schematic block view showing the internal construction of a main part of the bent type zoom optical system of the digital camera depicted in FIG. 5.

FIGS. 5, 6 and 8 are conceptual illustrations of the bent type zoom optical system of the invention built as a taking optical system 41 in a digital camera: FIG. 5 is a front perspective view of the construction of a digital camera 40, FIG. 6 is a rear perspective view of the same, and FIG. 7 is illustrative in section of the construction of the digital camera 40. The digital camera 40 here comprises a taking optical system 41 having a taking optical path 42, a finder optical system 43 having a finder optical path 44, a shutter 45, a flash 46, a liquid crystal display monitor 47, etc. As the shutter 45 located on the upper site of the camera 40 is pressed down, it causes taking to be implemented through the taking optical system 41, e.g., the bent type zoom optical system of Example 1. An object image formed through the taking optical system 41 is formed on the imaging plane of an imaging device 49 such as CCD or CMOS by way of a near-infrared cut filter and an optical low-pass filter F. The object image received at the imaging device 49 such as CCD or CMOS is displayed as an electronic image on the liquid crystal display monitor (LCD) 47 mounted on the back surface of the camera by way of processing means (e.g., CPU) 51. The processing means 51 here may just as well be connected with recording means (e.g., a memory) 52 for the recording of the taken electronic image. Note here that the recording means 52 may be provided separately from the processing means 51 or, alternatively, it may be designed such that images are electronically recorded and written therein by means of a floppy (registered trademark) disc, a memory card, MO, DVD±RW, etc. The digital camera here may also be set up as a silver-salt camera wherein a silver-salt film is used in place of CCD or other imaging device 49.

Further on the finder optical path 44, there is a finder objective optical system 53 mounted. An object image formed by the finder objective optical system 53 is formed on the field frame 57 of a Porro prism 55 that is an image erecting member. In the rear of the Porro prism 55, there is an eyepiece optical system 59 located for guiding an erected image to a viewer's eyeball E. Note here that cover members 50 are located on the entrance side of the taking optical system 41 and finder objective optical system 53 and on the exit side of the eyepiece optical system 59, respectively.

FIG. 8 is a schematic block diagram of the internal construction of a main part of the aforesaid digital camera 40. An operating portion represented by the shutter 45 is indicated by reference numeral 500. The processing means is supposed to comprise CPU 51; the imaging device is supposed to comprise CCD 49; and the recording means is supposed to comprise a memory card 521 and an external storage device (optical disc, HDD or the like) 522. As CPU 51 senses that the shutter 45 at the operation portion 500 is pressed down, it implements computation for an optimal shutter control value due to exposure control and stop control. After such computation, shutter control and stop control are gained on the basis of these control values. Any other control operation takes place as already noted.

Because, in the thus assembled digital camera 40, the taking optical system 41 has a high zoom ratio with good aberrations, and is bright with a reduced entire length, it is possible to reduce the size and thickness of the whole camera.

While it is shown in FIG. 7 and described that a plane-parallel plate is located for the cover member 50, it is contemplated that a powered lens may just as well be used.

Figure 9:
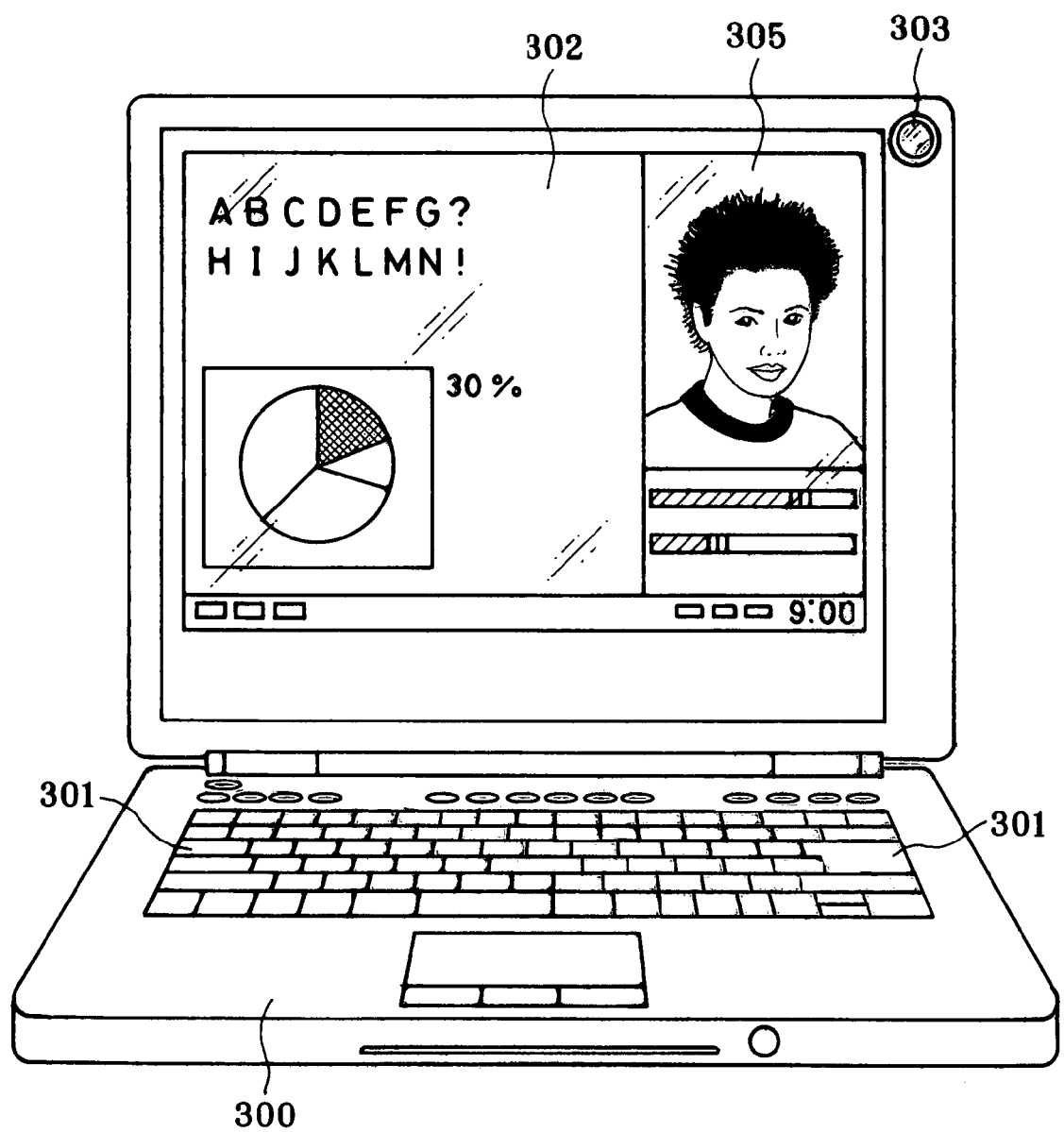
FIG. 9 is a front perspective view of a personal computer with a cover flipped open, wherein the bent type zoom optical system of the invention is built as an objective optical system.
Figure 10:
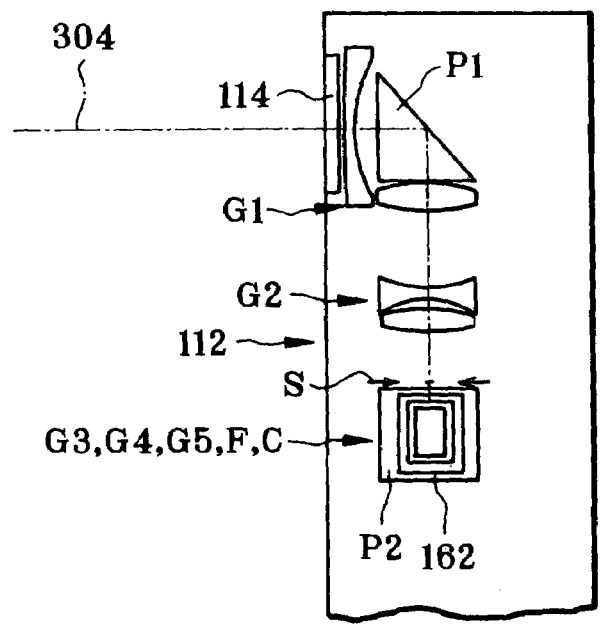
FIG. 10 is a sectional view of a taking optical system in the personal computer.
Figure 11:
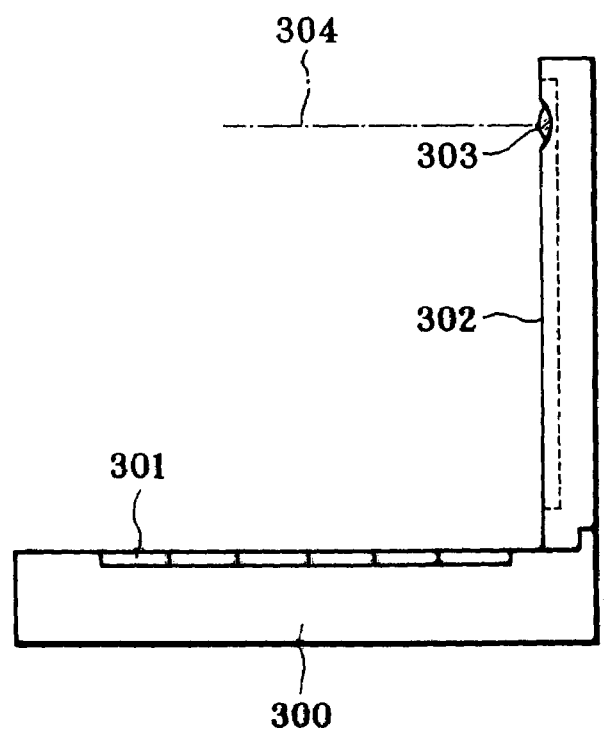
FIG. 11 is a side view of the state of FIG. 10.

FIGS. 9, 10 and 11 are illustrative of one example of an information processor wherein the bent type zoom optical system of the invention is built as an objective optical system: FIG. 9 is illustrative of a personal computer 300 with a cover flipped open; FIG. 10 is a sectional view of a taking optical system 303 in the personal computer 300; and FIG. 11 is a side view of a state shown in FIG. 9. As depicted in FIGS. 9, 10 and 11, the personal computer 300 includes a keyboard 301 adapted to let an operator enter information in it from outside, information processing or recording means not shown, a monitor 302 adapted to present information to the operator, and a taking optical system 303 adapted to take an image of the operator and surrounding images. The monitor 302 here may be a transmission type liquid crystal display device illuminated from its back surface by means of a backlight not shown, a reflection type liquid crystal display device designed to reflect light from its front to display images, a CRT display or the like. While it is shown that the taking optical system 303 is built in the right-upper portion of the monitor 302, it is contemplated that it may also be located somewhere else around the monitor 302 or the keyboard 301.

The taking optical system 303 includes on a taking optical path 304 an objective lens 112 comprising the bent type zoom optical system of the invention and an imaging device chip 162 for the reception of images. Note here that a cover glass 114 for the protection of the objective lens 112 is located over the opposite end thereof. All these components are built in the personal computer 300.

Received at the imaging device chip 162, an object image is entered in the processing means of the personal computer 300, and displayed as an electronic image on the monitor 302. As an example, an image 305 taken of the operator is shown in FIG. 9. This image 305 may also be displayed on a personal computer on the other end somewhere else by way of the processing means as well as the Internet or telephone line.

Figure 12A:
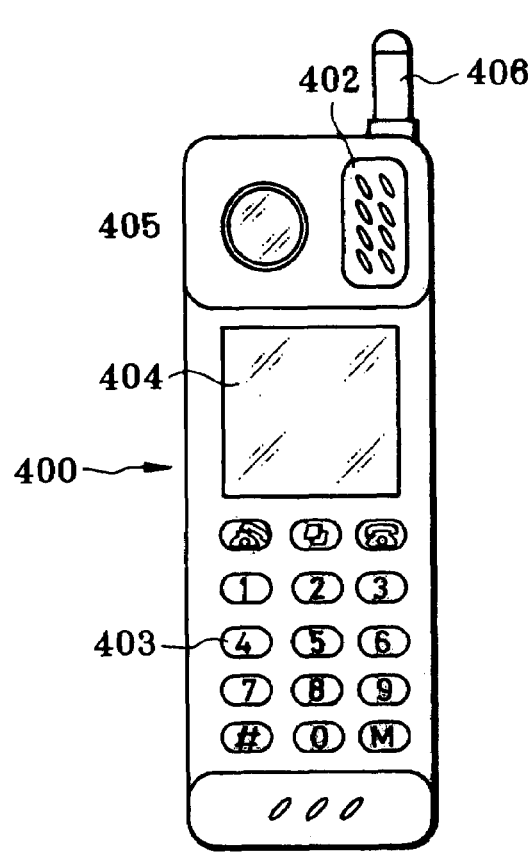
FIGS. 12(a) and 12(b) are a front and a side view of a cellular phone wherein the bent type zoom optical system of the invention is built as an objective optical system.
Figure 12B:
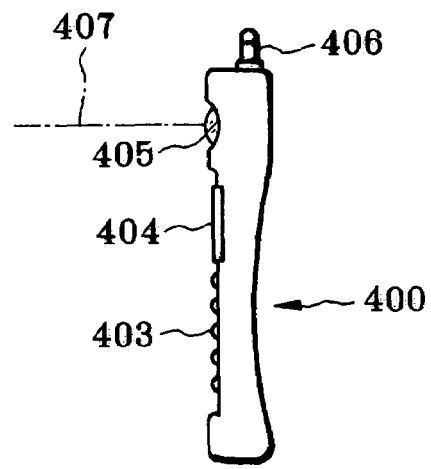
Figure 12C:
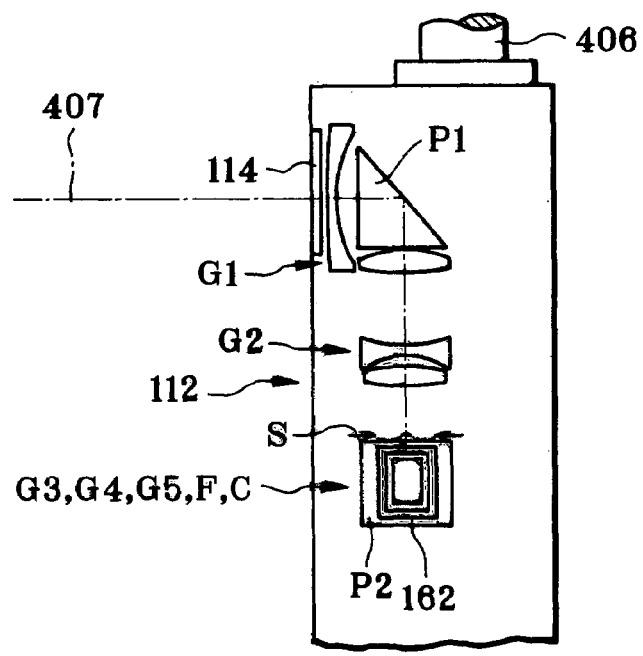
FIG. 12(c) is a sectional view of a taking optical system in it.

FIGS. 12(a), 12(b) and 12(c) are illustrative of a telephone set that is one example of the information processor in which the bent type zoom optical system of the invention is built as a taking optical system, especially a convenient-to-carry cellular phone. FIG. 12(a) and FIG. 12(b) are a front and a side view of a cellular phone 400, respectively, and FIG. 12(c) is a sectional view of a taking optical system 405. As shown in FIGS. 12(a), 12(b) and 12(c), the cellular phone 400 comprises a microphone 401 adapted to enter the voice of an operator in it as information, a speaker 402 adapted to produce the voice of the person on the other end, an input dial 403 via which the operator enters information therein, a monitor 404 adapted to display an image taken of the operator or the person on the other end and indicate information such as telephone numbers, the taking optical system 405, an antenna 406 for transmitting and receiving communication waves, and processing means (not shown) adapted to process image information, communication information, input signals, etc. Here the monitor 404 is a liquid crystal display device. It is noted that the components need not be arranged as shown. The taking optical system 405 comprises, on a taking optical path 407, an objective lens 112 comprising the bent type zoom optical system of the invention and an imaging device chip 162 located on the image plane thereof for receiving an object image. The objective lens 112 is further provided at its end with a cover glass 114 for its protection. These components are built in the cellular phone 400.

An object image received at the imaging device chip 162 is entered in processing means (not shown), so that the object image can be displayed as an electronic image on the monitor 404 and/or a monitor on the other end. The processing means also include a signal processing function for converting information about the object image received at the imaging device chip 162 into transmittable signals, thereby sending the image to the person on the other end.

I claim:

1. A bent type zoom optical system, comprising,
in order from its object side, a positive first lens group adapted to remain fixed upon zooming, a negative second lens group adapted to move toward an image plane side upon zooming from a wide-angle side to a telephoto side, a third lens group adapted to remain fixed upon zooming, and a unit designed such that a combined focal length distance between said third lens group and an image plane is positive,
wherein said positive first lens group includes a first reflecting member and a negative single lens on an object side of said first reflecting member, and said third lens group comprises, in order from its object side, a stop, a second reflecting member and a positive lens unit, wherein said second reflecting member is located in such a way as to bend an optical path in a direction orthogonal to a plane defined by an optical axis of said first lens group on an entrance side thereof and an optical axis bent by said first reflecting member, and
wherein said unit includes a positive fourth lens group and a positive fifth lens group, and said fourth and fifth lens groups move such that, upon zooming, the fourth lens group is positioned more on the object side and the fifth lens group is positioned more on the image plane side on the telephoto side than at the wide-angle end.

2. A bent type zoom optical system, comprising,
in order from its object side, a positive first lens group adapted to remain fixed upon zooming, a negative second lens group adapted to move toward an image plane side upon zooming from a wide-angle side to a telephoto side, a third lens group adapted to remain fixed upon zooming, and a unit designed such that a combined focal length distance between said third lens group and an image plane is positive,
wherein said positive first lens group includes a first reflecting member and a negative single lens on an object side of said first reflecting member, said second lens group consists of, in order from its object side, a negative lens and a positive lens: two lenses in all, and said third lens group comprises a stop and a second reflecting member, wherein said second reflecting member is located in such a way as to bend an optical path in a direction orthogonal to a plane defined by an optical axis of said first lens group on an entrance side thereof and an optical axis bent by said first reflecting member, and
wherein said unit includes a positive fourth lens group and a positive fifth lens group, and said fourth and fifth lens groups move such that, upon zooming, the fourth lens group is positioned more on the object side and the fifth lens group is positioned more on the image plane side on the telephoto side than at the wide-angle end.

3. The bent type zoom optical system according to claim 1 or 2, wherein the following condition is satisfied:

$$1.4 < |f_2|/f_w < 2.5 \quad (1)$$

where $f_2$: a focal length of the second lens group, and
$f_w$: a focal length of the zoom optical system at a wide-angle end.

4. The bent type zoom optical system according to claim 1 or 2, wherein the following condition is satisfied:

$$0.5 < |L_1|/f_1 < 1.0 \quad (2)$$

where $L_1$: a focal length of the negative lens in the first lens group, and $f_1$: a focal length of the first lens group.

5. An imaging apparatus, comprising:
a bent type zoom optical system as recited in claim 1 or 2, and an imaging device located at a position for reception of an object image formed by said bent type zoom optical system.

6. An information processor, comprising:
a bent type zoom optical system as recited in claim 1 or 2, an imaging device located at a position for reception of an object image formed by said bent type zoom optical system, a CPU adapted to process electronic signals photoelectrically converted by said imaging device, an input portion adapted to receive information signals that an operator wants to enter in said CPU, a display processing means adapted to display an output from said CPU on a display apparatus, and a recording medium adapted to record an output from said CPU therein, wherein said CPU is adapted to display on the display apparatus an object image received through said bent type zoom optical system at said imaging device.

7. The information processor according to claim 5, wherein said information processor is a portable terminal.

8. An electronic camera apparatus, comprising a bent type zoom optical system as recited in claim 1 or 2, an imaging device located at a position for reception of an object image formed by said bent type zoom optical system, a CPU adapted to process electronic signals photoelectrically converted by said imaging device, and a display device adapted to display an object image received at said imaging device in a visible way, wherein a recording medium for recording image information on the object image received at said imaging device is incorporated, or inserted or de-inserted, and said CPU includes a display apparatus adapted to display on the display device an object image received at said imaging device, and recording/processing means adapted to record the object image received at said imaging device in said recording medium.

9. An imaging apparatus comprising:
a bent type zoom optical system as recited in claim 3, and an imaging device located at a position for reception of an object image formed by said bent type zoom optical system.

10. An imaging apparatus comprising:
a bent type zoom optical system as recited in claim 4, and an imaging device located at a position for reception of an object image formed by said bent type zoom optical system.

11. An information processor comprising:
a bent type zoom optical system as recited in claim 3, imaging device located at a position for reception of an object image formed by said bent type zoom optical system, a CPU adapted to process electronic signals photoelectrically converted by said imaging device, an input portion adapted to receive information signals that an operator wants to enter in said CPU, a display processing means adapted to display an output from said CPU on a display apparatus, and a recording medium adapted to record an output from said CPU therein, wherein said CPU is adapted to display on the display apparatus an object image received through said bent type zoom optical system at said imaging device.

12. An information processor comprising:
a bent type zoom optical system as recited in claim 4, an imaging device located at a position for reception of an object image formed by said bent type zoom optical system, a CPU adapted to process electronic signals photoelectrically converted by said imaging device, an input portion adapted to receive information signals that an operator wants to enter in said CPU, a display processing means adapted to display an output from said CPU on a display apparatus, and a recording medium adapted to record an output from said CPU therein, wherein said CPU is adapted to display on the display apparatus an object image received through said bent type zoom optical system at said imaging device.

13. An electronic camera apparatus, comprising:
a bent type zoom optical system as recited in claim 3, an imaging device located at a position for reception of an object image formed by said bent type zoom optical system, a CPU adapted to process electronic signals photoelectrically converted by said imaging device, and a display device adapted to display an object image received at said imaging device in a visible way, wherein a recording medium for recording image information on the object image received at said imaging device is incorporated, or inserted or de-inserted, and said CPU includes a display apparatus adapted to display on the display device an object image received at said imaging device, and recording/processing means adapted to record the object image received at said imaging device in said recording medium.

14. An electronic camera apparatus, comprising:
a bent type zoom optical system as recited in claim 4, an imaging device located at a position for reception of an object image formed by said bent type zoom optical system, a CPU adapted to process electronic signals photoelectrically converted by said imaging device, and a display device adapted to display an object image received at said imaging device in a visible way, wherein a recording medium for recording image information on the object image received at said imaging device is incorporated, or inserted or de-inserted, and said CPU includes a display apparatus adapted to display on the display device an object image received at said imaging device, and recording/processing means adapted to record the object image received at said imaging device in said recording medium.

* * * * *